United States Patent [19]

Ishiwatari

[11] 4,186,436
[45] Jan. 29, 1980

[54] BOOSTER CIRCUIT

[75] Inventor: Masumi Ishiwatari, Zushi, Japan

[73] Assignee: Canon Kabushiki Kaisha, Tokyo, Japan

[21] Appl. No.: 871,746

[22] Filed: Jan. 23, 1978

[30] Foreign Application Priority Data

Jan. 27, 1977 [JP] Japan .................. 52-8139

[51] Int. Cl.² ............................................. H02M 7/00
[52] U.S. Cl. ............................................. 363/60
[58] Field of Search .................. 307/109, 110; 320/1; 363/59, 60

[56] References Cited

U.S. PATENT DOCUMENTS

| 2,463,509 | 3/1949 | Bird | 307/110 X |
| 2,631,249 | 3/1953 | Smith | 363/59 X |
| 3,032,714 | 5/1962 | Cohen | 320/1X |
| 3,943,428 | 3/1976 | Whidden | 363/60 |
| 3,955,353 | 5/1976 | Astle | 363/60 X |

FOREIGN PATENT DOCUMENTS 2035223  1/1972  Fed. Rep. of Germany ............ 363/59

Primary Examiner—William M. Shoop
Attorney, Agent, or Firm—Fitzpatrick, Cella, Harper & Scinto

[57] ABSTRACT

A voltage step-up circuit, or booster circuit, wherein in response to a first signal a first switching element is enabled to charge a first capacitor with an input voltage while a second switching element is disabled, and in response to a second signal the second switching element is enabled to charge with the input voltage a second capacitor connected in series to the first capacitor while the first switching element is disabled. The sum of the voltages appearing across the first and second capacitors is derived as an output voltage. The "ON" and "OFF" times of the first and second signals may be varied, and the ratio between the "ON" time of the first signal to the "ON" time of the second signal may also be varied. The number of switching elements and capacitors may be increased as needed.

6 Claims, 6 Drawing Figures

BOOSTER CIRCUIT

BACKGROUND OF THE INVENTION

1. Field of the Invention

The present invention relates to a booster circuit.

2. Description of the Prior Art

In order to drive a liquid crystal display device incorporated in a desktop computer or in a pocket-size calculator, a power source must supply a voltage of the order of 4.5 to 10 V. In general the desktop computers and pocket-size calculators operate on one or two mercury or silver oxide batteries (1.5 V to 3.0 V) so that a booster or step-up circuit must be provided in order to drive the liquid crystal display device.

To this end DC-DC converters including a boosting transformer have been used, but their energy transfer efficiency is considerably low as their power consumption is as much as or exceeds the power consumption in a load or a liquid crystal display device. Furthermore the DC-DC converter represents a considerable part of the cost of the desktop computer or the pocket-size calculator so that the cost of the DC converter must be reduced in order to reduce the total cost of the calculator.

SUMMARY OF THE INVENTION

In view of the above, one of the objects of the present invention is to provide a booster circuit with less power consumption.

Another object of the present invention is to provide a booster circuit best adapted to be implemented on an one-chip calculator.

The above and other objects, features and advantages of the present invention will become more apparent from the following description of preferred embodiments thereof taken in conjunction with the accompanying drawings.

DESCRIPTION OF THE PREFERRED EMBODIMENTS

Figure 1:
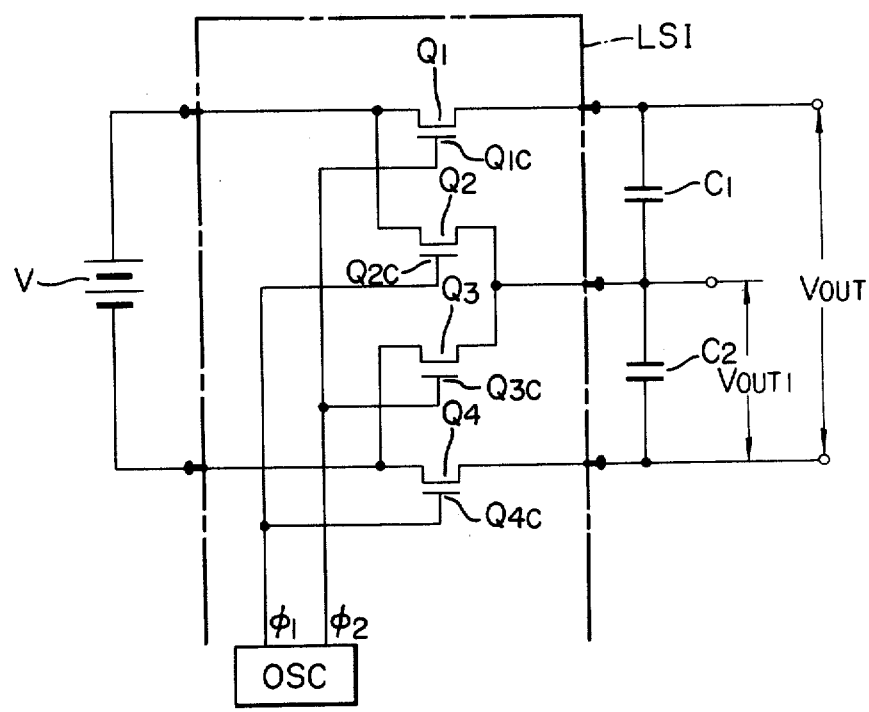
FIG. 1 is a schematic diagram of a booster circuit in accordance with the present invention.
Figure 2:
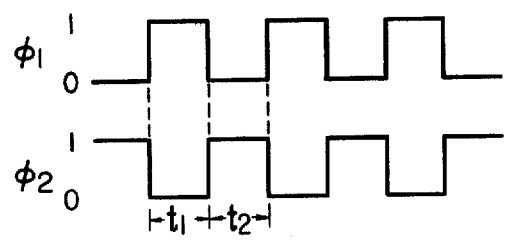
FIG. 2 is a timing diagram of signals controlling the operation of the booster circuit shown in FIG. 1.

In FIG. 1 there is shown a first embodiment of the booster or step-up circuit in accordance with the present invention. An input voltage V which is of a silver oxide battery of a voltage to be boosted is impressed across capacitors C1 and C2 through switching elements Q1–Q4 such as MOS transistors which are enabled or disabled in response to signals $\phi 1$ and $\phi 2$ applied to control terminals Q1c–Q4c from a signal generator OSC. FIg. 2 shows the waveforms of these control signals $\phi 1$ and $\phi 2$.

Next the mode of operation will be described. First it is assumed that no charge be stored in the capacitors C1 and C2. Then when the signal $\phi 1$ is "1" and the signal $\phi 2$ is "0", the switching elements Q2 and Q4 are enabled and the switching elements Q1 and Q3 are disabled. Therefore the input voltage V is applied across the capacitor C2 through the switching elements Q2 and Q4. The voltage V1 across the capacitor C2 is substantially equal to the input voltage V.

When the signal $\phi 1$ changes to "0" and the signal $\phi 2$ changed to "1", the switching elements Q2 and Q4 are disabled and the switching elements Q1 and Q3 are enabled. Therefore while the voltage across the capacitor C2 remains unchanged, the capacitor C1 is charged with the input voltage V through the enabled switching elements Q1 and Q3. The voltage V2 across the capacitor C1 is substantially equal to the input voltage V.

Now the output voltage Vout of the booster or step-up circuit becomes V1+V2 which is higher than the input voltage V. This procedure is repeated in response to changes in signals $\phi 1$ and $\phi 2$ so that the output voltage Vout is repeatedly obtained.

The booster circuit may be implemented on the same chip as of arithmetic and logic circuits of digital equipment such as a pocket-size calculator.

Figure 3A:
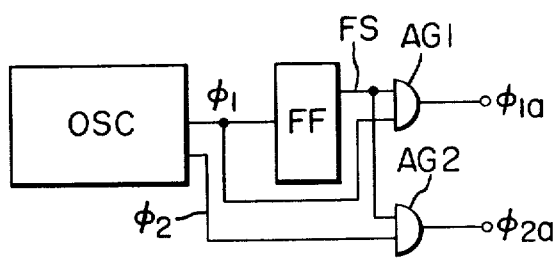
FIG. 3A is a block diagram of a signal generator.
Figure 3B:
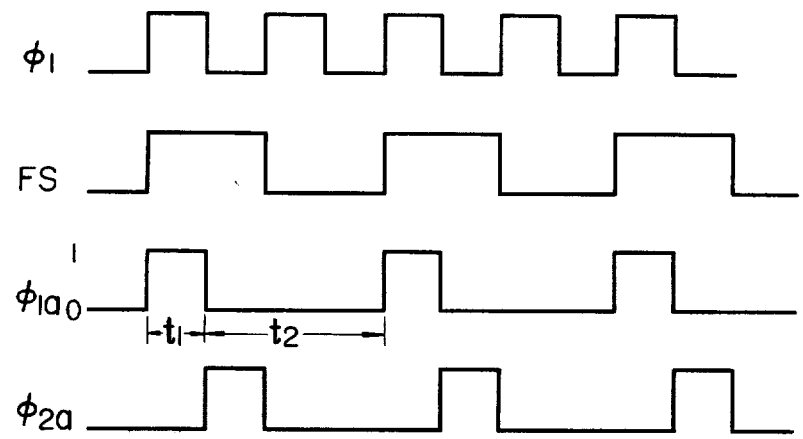
FIG. 3B shows the waveforms of signals appearing at the points of the signal generator shown in FIG. 3A.

In FIG. 3A there is shown a schematic diagram of a circuit for controlling the output voltage Vout of the booster circuit shown in FIG. 1, and FIG. 3B shows the waveforms of associated signals therewith. With this circuit, the ratio of the pulse duration of the "1" signal to the pulse duration of the "0" signal may be varied. That is, the output $\phi 1$ from the signal generator OSC is frequency divided in a flip-flop FF, and the output FS from the flip-flop FF and the output $\phi 1$ from the signal generator OSC are applied to AND gate AG1 to derive the control signal $\phi 1a$. In a like manner, the output FS from the flip-flop FF and the output $\phi 2$ from the signal generator OSC are applied to AND gate AG2 to derive the output $\phi 2a$ which is applied to the switching elements Q1 and Q3. Therefore the voltage appearing across the capacitor C1 or C2 may be varied.

Figure 4A:
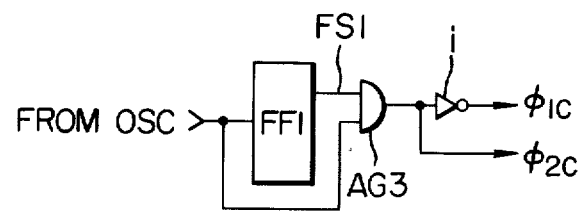
FIG. 4A is a block diagram of another signal generator.
Figure 4B:
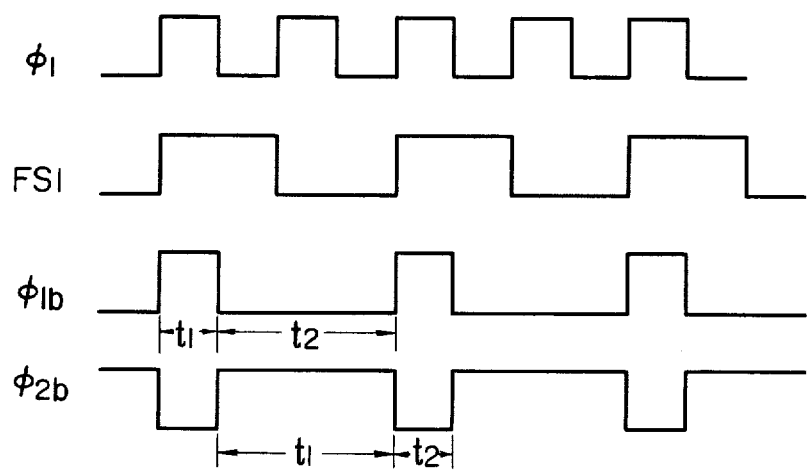
FIG. 4B shows the waveforms of signals appearing at the points of the signal generator shown in FIG. 4A.

In FIG. 4A there is shown a schematic diagram of another circuit for controlling the output voltage Vout, and FIG. 4B shows the waveforms of associated signals therewith. With this circuit, the ratio of the "1" state duration of the control signal $\phi 1$ to the "1" state duration of the control signal $\phi 2$ may be varied. That is, the output $\phi 1$ from the signal generator OSC is frequency divided in a flip-flop FF1, and the output FS1 from the flip-flop FF1 and the signal $\phi 1$ are applied to AND gate AG3 to derive the control signal $\phi 2c$ which is applied to the switching elements Q2 and Q4. The output from AND gate AG3; that is, the control signal $\phi 2c$ is inverted by an inverter i to derive the control signal $\phi 1c$ which is applied to the switching elements Q1 and Q3.

Therefore the voltage appearing across the capacitor C2 is higher than the voltage across the capacitor C1 so that when another output voltage Vout2 is derived across the capacitor C2, the drop in output voltage Vout may be prevented.

Instead of the circuit shown in FIG. 4A, the capacitors C1 and C2 may have different capacitances to attain the same effects.

So far the number of capacitors has been described as being two, but it will be apparent to those skilled in the art that the number of capacitors may be increased based on the description above.

Thus according to the present invention the energy transfer efficiency may be considerably improved without the use of a transformer.

I claim:

1. Semiconductor unit for producing higher potential than input voltage by the use of electric energy storage means comprising:
   first and second input terminals for supplying electric energy to said unit;
   a first switching circuit for transmitting the electric energy applied to said first and second input terminals, said first switching circuit comprising a first electric switching element (Q1) and a second electric switching element (Q3);
   a second switching circuit for transmitting the electric energy applied to said first and second input terminals, said second switching circuit comprising a third electric switching element (Q2) and a fourth electric switching element (Q4);
   a first output terminal electrically connected through the first switching element of said first switching circuit to said first input terminal;
   a second output terminal electrically connected through the second switching element of said first switching circuit to said second input terminal, and connected through the third switching element of said second switching circuit to said first input terminal;
   a third output terminal electrically connected through the fourth switching element of said second switching circuit to said input terminal;
   (a) first energy storage means coupled between said first output terminal and said second output terminal;
   (b) second energy storage means coupled between said second output terminal and said third output terminal; and
   a signal generating circuit for generating a first pulse signal train to be applied to said first switching circuit and a second pulse signal train to be applied to said second switching circuit, the pulses of the first and second pulse signal trains being different in phase from each other, and thus said first and second switching circuits being alternatively driven;
   whereby electric energy is stored in said first and second energy storage means.

2. Semiconductor unit according to claim 1 wherein the pulses of the first and second pulse signal trains of said signal generating circuit are different in pulse width from each other.

3. Semiconductor unit according to claim 1 wherein said first and second switching circuits comprise MOS transistors.

4. Semicondutor unit according to claim 1, wherein said first and second energy storage means are capacitors.

5. Monolithic semiconductor unit according to claim 4 wherein the pulses of the first and second pulse signal trains of said signal generating circuit are different in the pulse width from each other.

6. Monolithic semiconductor unit according to claim 4 wherein said first and second switching circuits comprise MOS transistors.

* * * * *